US012726875B2

(12) United States Patent
Wu et al.

(10) Patent No.: US 12,726,875 B2
(45) Date of Patent: Sep. 1, 2026

(54) METHODS AND APPARATUSES FOR A DAPS FAILURE RECOVERY MECHANISM AND A MRO MECHANISM FOR CHO AND DAPS PROCEDURES

(71) Applicant: Lenovo (Beijing) Limited, Beijing (CN)

(72) Inventors: Lianhai Wu, Beijing (CN); Mingzeng Dai, Shanghai (CN); Yan Le, Shanghai (CN); Congchi Zhang, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 406 days.

(21) Appl. No.: 18/255,181

(22) PCT Filed: Dec. 8, 2020

(86) PCT No.: PCT/CN2020/134528

§ 371 (c)(1),
(2) Date: May 31, 2023

(87) PCT Pub. No.: WO2022/120569

PCT Pub. Date: Jun. 16, 2022

(65) Prior Publication Data

US 2023/0422137 A1 Dec. 28, 2023

(51) Int. Cl.
*H04W 36/30* (2009.01)
*H04W 76/20* (2018.01)
(Continued)

(52) U.S. Cl.
CPC ......... *H04W 36/305* (2018.08); *H04W 76/20* (2018.02); *H04W 36/185* (2023.05); *H04W 36/362* (2023.05)

(58) Field of Classification Search
CPC ..... H04W 36/30; H04W 36/36; H04W 36/18; H04W 36/20; H04W 36/08; H04W 76/20;
(Continued)

(56) References Cited

U.S. PATENT DOCUMENTS 11,190,997 B2 * 11/2021 Kim ..................... H04W 24/08
11,722,994 B2 * 8/2023 Lei ................... H04W 72/0453
370/329

(Continued)

FOREIGN PATENT DOCUMENTS

CN 110290560 A 9/2019
CN 111757400 A 10/2020

(Continued)

OTHER PUBLICATIONS 20964514.2, "Communication Pursuant to Rule 164(1) EPC", EP Application No. 20964514.2, Aug. 12, 2024, 20 pages.

(Continued)

*Primary Examiner* — Man U Phan
(74) *Attorney, Agent, or Firm* — FIG. 1 Patents

(57) ABSTRACT

Embodiments of the present application relate to methods and apparatuses for a dual active protocol stack (DAPS) failure recovery mechanism and a mobility robustness optimization (MRO) mechanism for conditional handover (CHO) and DAPS procedures. According to an embodiment of the present application, a method can include: receiving CHO configuration information, wherein the CHO configuration information is associated with a CHO candidate cell, wherein the CHO configuration information includes a RRC reconfiguration message and a set of one or more execution conditions; in response to meeting one or more execution conditions associated with the CHO candidate cell, performing a CHO procedure from a source cell to the CHO candidate cell; and in response to successfully accessing the (Continued)

CHO candidate cell or in response to an occurrence of a failure during the CHO procedure, transmitting time related assistant information to a serving cell, wherein the serving cell is one of the source cell and the CHO candidate cell. In addition, a recovery procedure and a MRO mechanism associated with a DAPS handover procedure are also studied.

12 Claims, 8 Drawing Sheets

(51) Int. Cl.
*H04W 36/18* (2009.01)
*H04W 36/36* (2009.01)

(58) Field of Classification Search
CPC ..... H04W 76/30; H04W 76/27; H04W 74/08; H04W 4/00; H04W 24/08; H04W 24/10; H04W 36/00; H04W 72/54; H04W 76/19; H04W 76/15; H04W 76/28; H04W 36/32
USPC .......................................................... 370/331
See application file for complete search history.

(56) References Cited

U.S. PATENT DOCUMENTS

| | | | | |
|---|---|---|---|---|
| 11,785,664 | B2 * | 10/2023 | Latheef | H04W 76/30<br>370/329 |
| 11,917,460 | B2 * | 2/2024 | Awoniyi-Oteri | H04W 72/23 |
| 11,991,539 | B2 * | 5/2024 | Xu | H04W 24/02 |
| 12,052,617 | B2 * | 7/2024 | Kim | H04W 36/00837 |
| 12,250,602 | B2 * | 3/2025 | Wu | H04W 36/0079 |
| 12,262,266 | B2 * | 3/2025 | Parichehrehteroujeni | H04W 76/19 |
| 12,302,201 | B2 * | 5/2025 | Jung | H04W 4/40 |
| 12,336,030 | B2 * | 6/2025 | Kim | H04W 76/15 |
| 2020/0314947 | A1 | 10/2020 | Latheef et al. | |
| 2023/0103126 | A1 * | 3/2023 | Liu | H04L 67/12<br>370/311 |
| 2023/0199578 | A1 * | 6/2023 | Wu | H04W 36/305<br>370/331 |
| 2023/0422135 | A1 * | 12/2023 | Wu | H04W 36/18 |

FOREIGN PATENT DOCUMENTS

| | | | |
|---|---|---|---|
| CN | 112042224 | A | 12/2020 |
| WO | 2020231224 | A1 | 11/2020 |

OTHER PUBLICATIONS

Ericsson, "Summary of AI 8.13.2.3—Other WID related SON features", 3GPP TSG-RAN WG2 #111-e R2-2010996, Nov. 2, 2020, 24 pages.
Lenovo, et al., "SON Enhancements for CHO", 3GPP TSG-RAN WGB Meeting #110e, R3-206454, Online [retrieved Nov. 28, 2023]. Retrieved from the Internet <https://www.3gpp.org/ftp/tsg_ran/WG3_lu/TSGR3_110-e/Docs>, Nov. 2020, 5 pages.
Session Chair (CMCC) , "Report from SON/MDT session", 3GPP TSG-RAN WG2 Meeting #112 electronic, R2-2010706, Online, Nov. 2020, 19 pages.
CATT, "Discussion on CHO and DAPS Mobility Enhancement", 3GPP TSG-RAN WG2 Meeting #112 electronic, R2-2008844, Online [retrieved May 26, 2023]. Retrieved from the Internet <https://www.3gpp.org/ftp/TSG_RAN/WG2_RL2/TSGR2_112-e/Docs>., Nov. 2020, 6 Pages.
Ericsson, "CHO and DAPS-related SON aspects", 3GPP TSG-RAN WG2 #112e, R2-2010146, Electronic meeting [retrieved May 26, 2023]. Retrieved from the Internet <https://www.3gpp.org/ftp/TSG_RAN/WG2_RL2/TSGR2_112-e/Docs>., Nov. 2020, 9 Pages.
Ericsson, "Summary of AI 8.13.2.1—Handover related SON aspects", 3GPP TSG-RAN WG2 #112-e, R2-2010995, Electronic meeting [retrieved May 26, 2023]. Retrieved from the Internet <https://www.3gpp.org/ftp/TSG_RAN/WG2_RL2/TSGR2_112-e/Docs?sortby=daterev>., Nov. 2020, 38 Pages.
Huawei, et al., "Discussion on handover related SON aspects", 3GPP TSG-RAN WG2 Meeting #112 electronic, R2-2010174, Online [retrieved May 26, 2023]. Retrieved from the Internet <https://www.3gpp.org/ftp/TSG_RAN/WG2_RL2/TSGR2_112-e/Docs?sortby=sizerev>., Nov. 2020, 9 Pages.
OPPO, "Consideration on handover related SON", 3GPP TSG-RAN WG2 Meeting #112 electronic, R2-2009017, Online [retrieved May 26, 2023]. Retrieved from the Internet <https://www.3gpp.org/ftp/TSG_RAN/WG2_RL2/TSGR2_112-e/Docs>., Nov. 2020, 7 Pages.
PCT/CN2020/134528, "International Preliminary Report on Patentability", PCT Application No. PCT/CN2020/134528, Jun. 22, 2023, 6 pages.
PCT/CN2020/134528, "International Search Report and Written Opinion", PCT Application No. PCT/CN2020/134528, Sep. 2, 2021, 8 pages.
20964514.2, "Extended European Search Report", EP Application No. 20964514.2, Nov. 5, 2024, 18 pages.

* cited by examiner

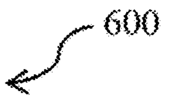

receiving CHO configuration information associated with a CHO candidate cell, wherein the CHO configuration information includes a RRC reconfiguration message and a set of one or more execution conditions

601 in response to meeting one or more execution conditions associated with the CHO candidate cell, performing a CHO procedure from a source cell to the CHO candidate cell

602 in response to successfully accessing the CHO candidate cell or in response to an occurrence of a failure during the CHO procedure, transmitting time related assistant information to a serving cell, wherein the serving cell is one of the source cell and the CHO candidate cell

700 receiving a dual active protocol stack (DAPS) handover command

701 performing a DAPS handover procedure from a source cell to a target cell, wherein performing the DAPS handover procedure comprises: starting a handover timer; and performing a random access (RA) procedure to the target cell

702 in response to failing to complete the DAPS handover procedure or in response to successfully completing a DAPS recovery procedure, transmitting assistant information to a serving cell, wherein the serving cell is one of the source cell and the target cell

METHODS AND APPARATUSES FOR A DAPS FAILURE RECOVERY MECHANISM AND A MRO MECHANISM FOR CHO AND DAPS PROCEDURES

TECHNICAL FIELD

Embodiments of the present application generally relate to wireless communication technology, in particular to methods and apparatuses for a dual active protocol stack (DAPS) failure recovery mechanism and a mobility robustness optimization (MRO) mechanism for a conditional handover (CHO) procedure and a DAPS handover procedure.

BACKGROUND

A base station (BS) can have some cells (or areas) to provide communication service. When a user equipment (UE) moves from a serving cell of a source BS to a target cell of a target BS, a handover procedure is performed.

When a radio link failure (RLF) or a handover (HO) failure occurs for a UE, the UE may perform a radio resource control (RRC) re-establishment procedure. The UE may access a cell by a successful RRC re-establishment procedure. The accessed network will request UE information including a RLF report of the UE, such that the network can optimize the mobility problem based on the UE information from the UE. Accordingly, the UE will transmit a failure report to the network.

3rd Generation Partnership Project (3GPP) 5G networks are expected to increase network throughput, coverage, and robustness and reduce latency and power consumption. With the development of 3GPP 5G networks, various aspects need to be studied and developed to perfect the 5G technology. Details regarding a DAPS failure recovery mechanism and a MRO mechanism for CHO and DAPS handover procedures have not been discussed in 3GPP 5G technology yet.

SUMMARY

Some embodiments of the present application provide a method, which may be performed by a UE. The method includes: receiving CHO configuration information, wherein the CHO configuration information is associated with a CHO candidate cell, wherein the CHO configuration information includes a RRC reconfiguration message and a set of one or more execution conditions; in response to meeting one or more execution conditions associated with the CHO candidate cell, performing a CHO procedure from a source cell to the CHO candidate cell; and in response to successfully accessing the CHO candidate cell or in response to an occurrence of a failure during the CHO procedure, transmitting time related assistant information to a serving cell, wherein the serving cell is one of the source cell and the CHO candidate cell.

Some embodiments of the present application provide a further method, which may be performed by a UE. The method includes: receiving a dual active protocol stack (DAPS) handover command; performing a DAPS handover procedure from a source cell to a target cell, wherein performing the DAPS handover procedure comprises: starting a handover timer, and performing a random access (RA) procedure to the target cell; and in response to failing to complete the DAPS handover procedure or in response to successfully completing a DAPS recovery procedure, transmitting assistant information to a serving cell, wherein the serving cell is one of the source cell and the target cell.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement any of the above-mentioned methods performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 6 illustrates an exemplary flow chart of a method for transmitting time related assistant information in accordance with some embodiments of the present application;

FIG. 7 illustrates an exemplary flow chart of a method for performing a DAPS handover procedure in accordance with some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
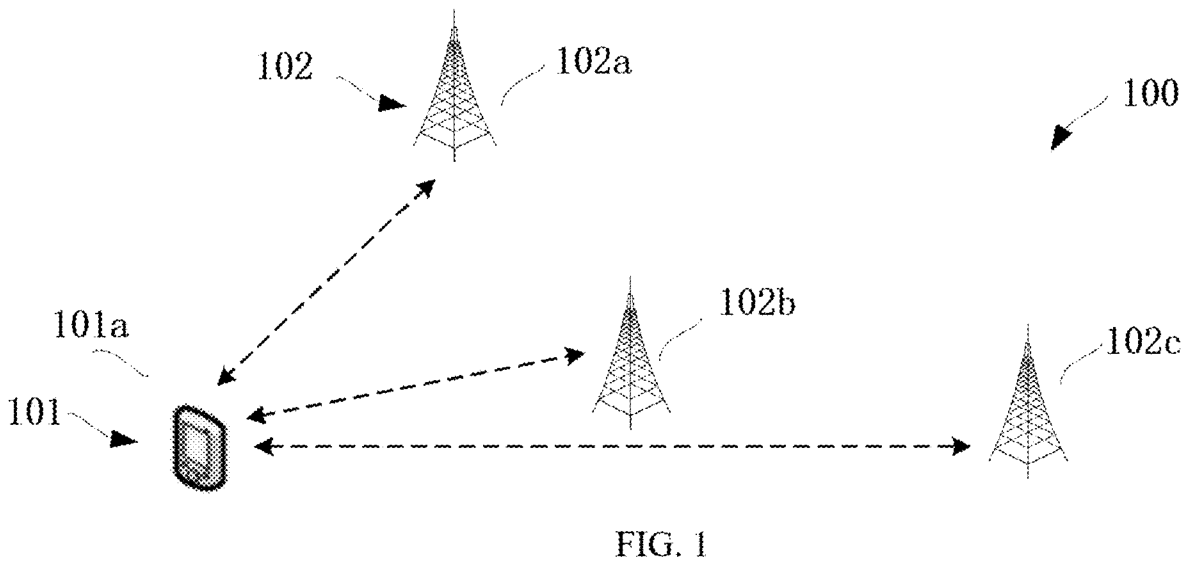
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101*a*) and three BSs 102 (e.g., BS 102*a*, BS 102*b*, and BS 102*c*) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of transmitting and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BS s 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of transmitting and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G of the 3GPP protocol, wherein BS(s) 102 transmit data using an OFDM modulation scheme on the downlink (DL) and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Each BS(s) 102 may include one or more cells. Each UE(s) 101 may perform a cell section procedure between different cell(s) of different BS(s). Each UE(s) 101 may handover from a serving cell of a source BS to a target cell of a target BS. For example, in the wireless communication system 100 as illustrated and shown in FIG. 1, BS 102*a* may function as a source BS, and each of BS 102*b* and BS 102*c* may function as a target BS. If there is a handover need, UE 101*a* as illustrated and shown in FIG. 1 may perform a handover procedure from a serving cell of BS 102*a* to a target cell of BS 102*b* or a target cell of BS 102*c*, which depends a result of a cell selection procedure. The handover procedure performed by UE 101*a* may be a CHO procedure.

As specified in 3GPP standard documents, CHO is defined as a handover that is executed by a UE when one or more handover execution conditions are met. The UE starts evaluating the execution condition(s) upon receiving the CHO configuration, and stops evaluating the execution condition(s) during the CHO procedure once the execution condition(s) is met.

Figure 2:
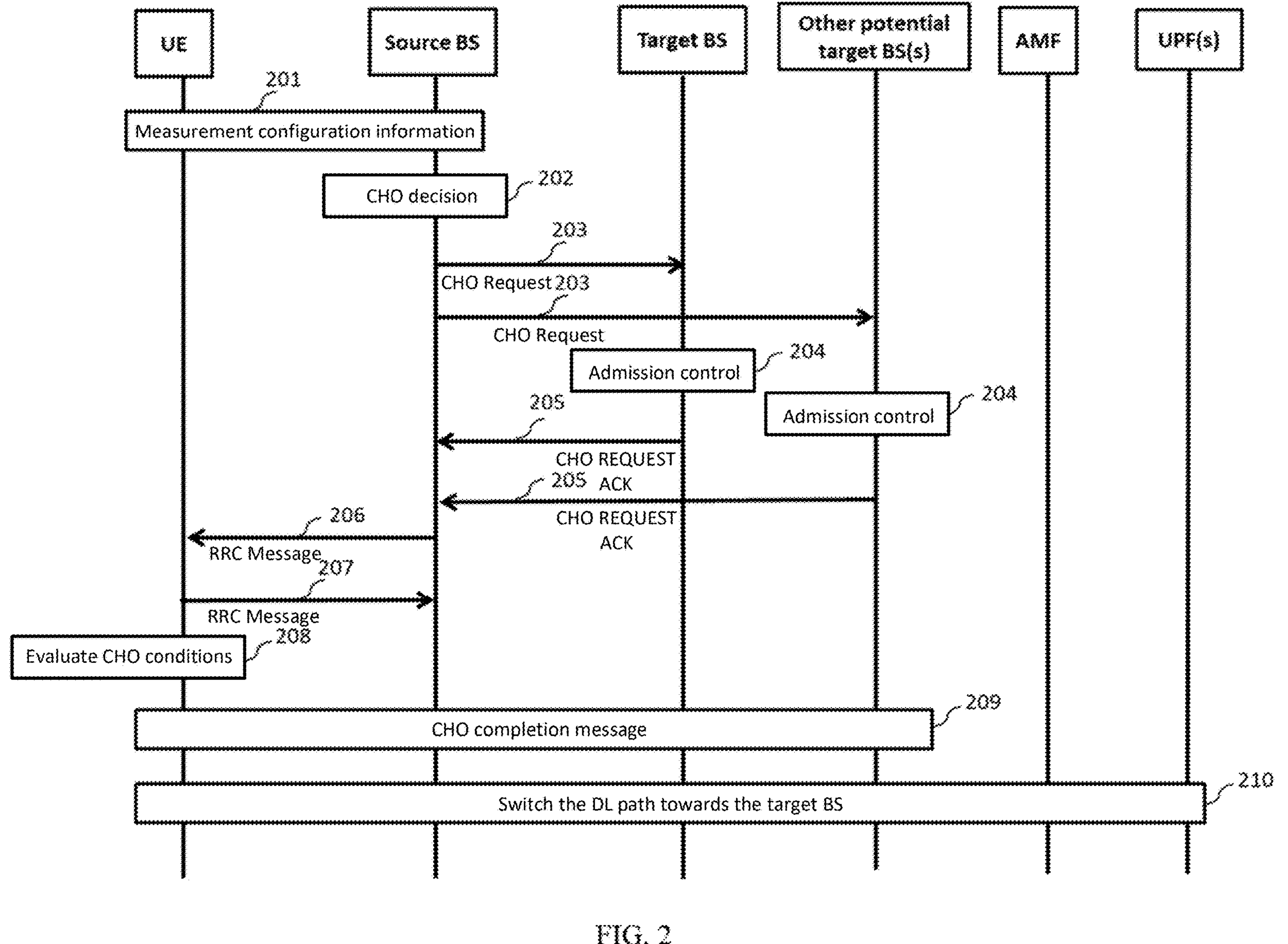
FIG. 2 illustrates an exemplary flowchart of an intra-AMF/UPF CHO procedure in accordance with some embodiments of the present application.

FIG. 2 illustrates an exemplary flowchart of an intra-AMF/UPF CHO procedure in accordance with some embodiments of the present application. The embodiments of FIG. 2 depict a basic CHO scenario where neither an access and mobility management function (AMF) nor a user plane function (UPF) changes.

Referring to FIG. 2, in operation 201, a source BS (e.g., BS 102*a* as illustrated and shown in FIG. 1) may transmit measurement configuration information to a UE (e.g., UE 101*a* as illustrated and shown in FIG. 1), and the UE may report a measurement result to the source BS based on the measurement configuration information. In operation 202, the source BS may decide to use a CHO procedure of the UE, which is based on the measurement result reported by the UE.

In operation 203, the source BS may transmit CHO REQUEST message to one target BS (e.g., BS 102*b* as illustrated and shown in FIG. 1) and other potential target BS(s) (e.g., BS 102*c* as illustrated and shown in FIG. 1). In operation 204, the target BS or other potential target BS(s) may perform an admission control based on the load of a target cell of the target BS or other potential target BS(s), to decide whether to allow the CHO procedure of the UE after receiving the CHO REQUEST message from the source BS.

In operation 205, based on an admission control result, the target BS or other potential target BS(s) may prepare handover resource(s) for the UE and send CHO REQUEST ACKNOWLEDGE message to the source BS.

In operation 206, the source BS may transmit RRCReconfiguration message to the UE. The RRCReconfiguration message may include configuration information of CHO candidate cell(s) and the corresponding CHO execution condition(s).

In operation 207, the UE may transmit RRCReconfigurationComplete message to the source BS. In operation 208, the UE may evaluate the CHO condition(s). If one of the CHO candidate cells satisfies the CHO execution condition (s), the UE may detach from the source cell and synchronize to the CHO candidate cell which satisfies the CHO execution condition(s).

In operation 209, the UE may transmit a CHO completion message to the target BS or other potential target BS(s). In operation 210, the 5G network may switch the DL data path towards the target BS or other potential target BS(s). Any ongoing data forwarding may continue.

As specified in 3GPP standard documents, MRO is for detecting connection failure(s) that occur due to Too Early or Too Late Handovers, or Handover to Wrong Cell. The general procedure is that after a RLF or a HO failure happens, a UE access a new cell by RRC re-establishment or connection setup. Once the UE enters a RRC connected state, the UE transmits a RLF report and a RACH report to the serving cell. The serving cell will transmit a failure indication including a RLF report to the last serving cell. Finally, the information is used to optimize the mobility.

Regarding the abovementioned function of MRO, the problems of Too Early or Too Late Handovers, or Handover to Wrong Cell are defined as follows:

[Intra-system Too Late Handover] A RLF occurs after the UE has stayed for a long period of time in the cell; and the UE attempts to re-establish the radio link connection in a different cell.

[Intra-system Too Early Handover] A RLF occurs shortly after a successful handover from a source cell to a target cell or a handover failure occurs during the handover procedure; and the UE attempts to re-establish the radio link connection in the source cell.

[Intra-system Handover to Wrong Cell] A RLF occurs shortly after a successful handover from a source cell to a target cell or a handover failure occurs during the handover procedure; and the UE attempts to re-establish the radio link connection in a cell other than the source cell and the target cell.

In the above definitions, the “successful handover” refers to the UE’s state, i.e., the successful completion of the radio access (RA) procedure.

Generally, in a UE information procedure, after a RLF or a HO failure occurs, a UE may perform a RRC re-establishment procedure in a cell. The UE will store some information related with the RLF failure and/or the HO failure. The UE stores the latest RLF Report, including both LTE and NR RLF report until the RLF report is fetched by the network or for 48 hours after the connection failure is detected. For analysis of connection failure(s), the UE makes the RLF report available to the network.

In a control plane handling in handover associated with a DAPS handover procedure, messages are directly exchanged between the BSs. A specific example is shown in FIG. 3 as below.

Figure 3:
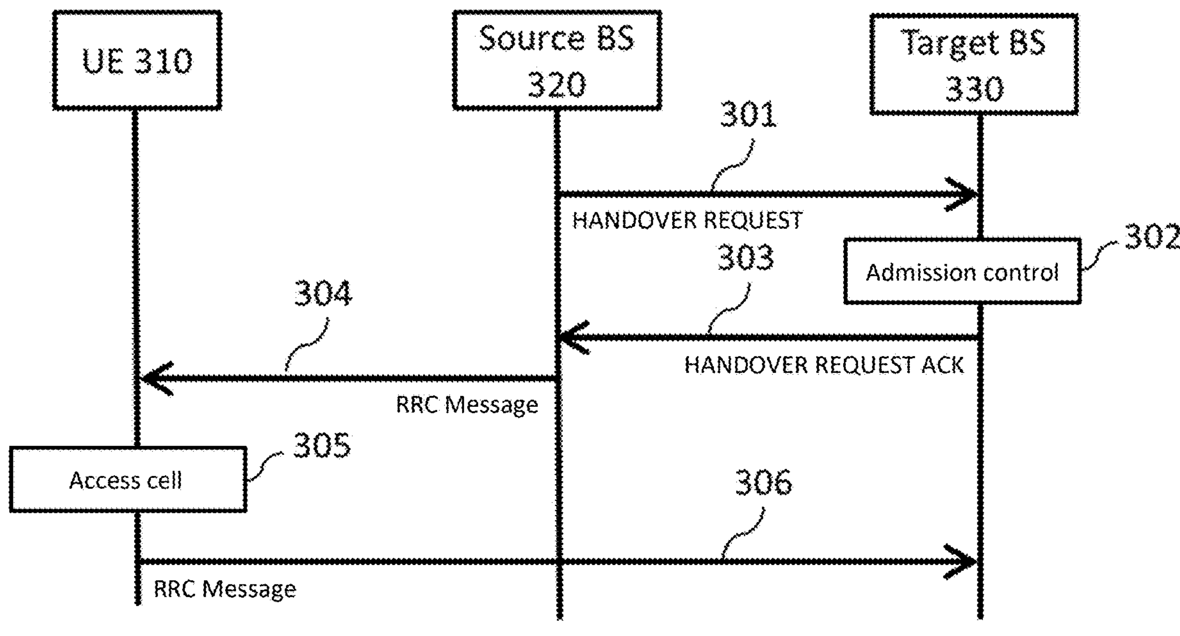
FIG. 3 illustrates an exemplary flowchart of an inter-BS handover procedure in accordance with some embodiments of the present application.

FIG. 3 illustrates an exemplary flowchart of an inter-BS handover procedure in accordance with some embodiments of the present application. The embodiments of FIG. 3 show a procedure of a UE (e.g., UE 310) communicating with two BSs (e.g., Source BS 320 and Target BS 330). In some examples, UE 310 may function as UE 101*a* in FIG. 1. Source BS 320 and Target BS 330 may function as two within BS 102*a*, BS 102*b*, and BS 102*c* in FIG. 1.

Referring to the embodiments of FIG. 3, in operation 301, Source BS 320 (e.g., BS 102*a* as illustrated and shown in FIG. 1) may transmit HANDOVER REQUEST message to Target BS 330 (e.g., BS 102*b* as illustrated and shown in FIG. 1). For example, the HANDOVER REQUEST message may pass a transparent RRC container with necessary information to prepare a handover procedure at Target BS 330 side.

In operation 302, Target BS 330 may perform admission control based on the load of a target cell of Target BS 330, to decide whether to allow the handover procedure of UE 310 (e.g., UE 101*a* as illustrated and shown in FIG. 1) after receiving the HANDOVER REQUEST message from Source BS 320.

In operation 303, based on an admission control result, Target BS 330 may prepare handover resource(s) for UE 310 and send HANDOVER REQUEST ACKNOWLEDGE including a RRC reconfiguration message to Source BS 320.

In operation 304, a RAN handover initiation is performed. Source BS 320 may transmit a RRC reconfiguration message to UE 310. The RRC reconfiguration message may include a reconfiguration with synchronization IE, e.g., reconfigurationWithSync IE as specified in 3GPP standard documents. The RRC reconfiguration message may contain information required to access the target cell of Target BS 330.

In operation 305, UE 310 may access to the target cell and complete the handover procedure. In operation 306, UE 310 may send RRCReconfigurationComplete message to Target BS 330.

In some embodiments, after implementing a DAPS handover procedure, UE 310 continues the downlink user data reception from Source BS 320 until releasing the source connection, and UE 310 continues the uplink user data transmission to Source BS 320 until a successful RA procedure to Target BS 330.

Figure 4:
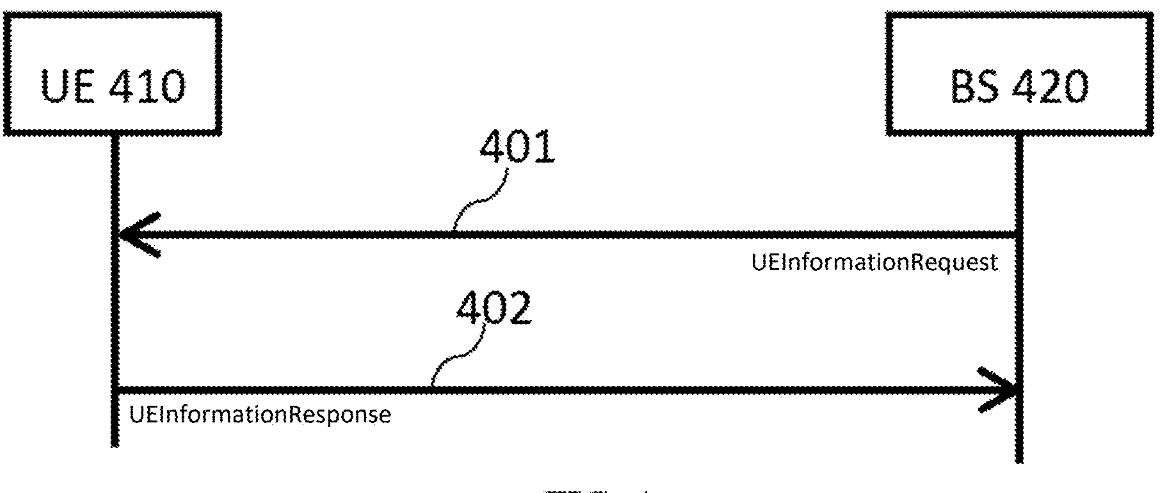
FIG. 4 illustrates an exemplary UE information procedure in accordance with some embodiments of the present application.

FIG. 4 illustrates an exemplary UE information procedure in accordance with some embodiments of the present application. The embodiments of FIG. 4 show a procedure of a UE (e.g., UE 410) communicating with a BS (e.g., BS 420). In some examples, UE 410 may function as UE 101*a* in FIG. 1. BS 420 may function as BS 102*a*, BS 102*b*, or BS 102*c* in FIG. 1.

As shown in FIG. 4, in operation 401, BS 420 (e.g., BS 102*a* as illustrated and shown in FIG. 1) transmits UEInformationRequest message to UE 410 (e.g., UE 101*a* as illustrated and shown in FIG. 1). BS 420 may be a source BS which controls a serving cell of UE 410. In operation 402, US 410 transmits UEInformationResponse message including a RLF report to BS 420. BS 420 can optimize a mobility problem based on the response transmitted from UE 410.

Figure 5:
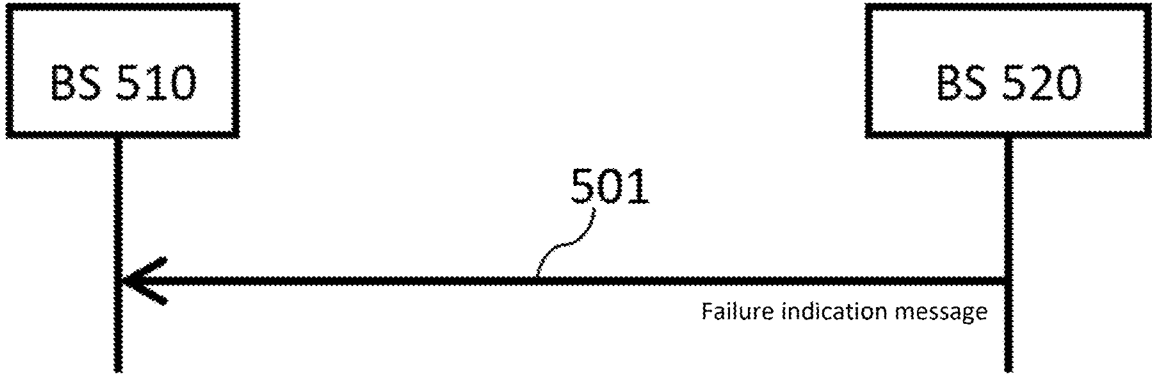
FIG. 5 illustrates an exemplary failure indication procedure in accordance with some embodiments of the present application.

In a 3GPP 5G system, a failure indication may be initiated after a UE attempts to re-establish the radio link connection at NG-RAN node B (e.g., BS 520 in FIG. 5) after a failure at NG-RAN node A (e.g., BS 510 in FIG. 5). NG-RAN node B (e.g., BS 520 in FIG. 5) may initiate a failure indication procedure towards multiple NG-RAN nodes if they control cells which use a physical cell identifier (PCI) signaled by the UE during the RRC re-establishment procedure. A failure indication may also be sent to the node last serving the UE when the NG-RAN node fetches the RLF report from the UE. A specific example of a failure indication procedure is described in FIG. 5.

The purpose of the failure indication procedure is to transfer information regarding RRC re-establishment attempts, or received RLF reports, between NG-RAN nodes. The signaling takes place from the NG-RAN node at which a re-establishment attempt is made, or a RLF report is received, to an NG-RAN node to which the UE concerned may have previously been attached prior to the connection failure. This may aid the detection of a RLF case or a HO failure case.

FIG. 5 illustrates an exemplary failure indication procedure in accordance with some embodiments of the present application. The embodiments of FIG. 5 show a procedure of one BS (e.g., BS 510) communicating with another BS (e.g., BS 520). In some examples, BS 510 or BS 520 may function as BS 102*a*, BS 102*b*, or BS 102*c* in FIG. 1.

As shown in FIG. 5, in operation 501, BS 520 transmits a failure indication message to BS 510. BS 510 is a source BS which controls the original serving cell of a UE (e.g., UE 101*a* as illustrated and shown in FIG. 1). BS 520 is a target BS or a new BS which controls a target cell or a CHO candidate cell of the UE. The failure indication message may be transmitted by Xn interface or X2 interface. For example, the failure indication message includes a container of a RLF report. The container of the RLF report may be transmitted by Xn interface or X2 interface.

The following table shows introductions of timer T304 as specified in 3GPP standard documents, including a starting condition, a stop condition, an operation at expiry, and a possible general name for timer T304.

message from a target cell. The purpose in both a successful HO report and a RLF-report is to improve a resource usage, since a target cell needs to reserve resource(s). The additional purpose in a RLF-report is to adjust the time for Too Early or Too Late Handovers as described above. Currently, any further detail regarding the corresponding CHO command has not been discussed yet.

Accordingly, the following issues need to be solved: how to understand the corresponding CHO command in the agreements of 3GPP RAN2; what additional measurement information should be reported in a successful DAPS report or a DAPS failure report; what additional measurement information should be reported in the successful DAPS report or the DAPS failure report; what is the recovery procedure after a successful RA procedure whereas a RLF on a target cell happens during the DAPS handover procedure; and what is the recovery procedure after a RA failure on a target cell happens during the DAPS handover procedure.

Embodiments of the present application aim to solve the above issues. Some embodiments of the present application provide a DAPS failure recovery mechanism in 3GPP 5G NR system or the like. Some embodiments of the present application provide a MRO mechanism for a CHO procedure and a DAPS handover procedure in 3GPP 5G NR system or the like.

For example, some time information is needed to evaluate a failure case, in order to identify Too Early Handover, Too Late Handover or Handover to Wrong Cell. Some embodiments of the present application aim to propose time information to evaluate the "potential failure" in the successful DAPS handover case.

| Timer | Start | Stop | At expiry | Name |
|---|---|---|---|---|
| T304 | Upon reception of RRCReconfiguration message including reconfigurationWith Sync or upon conditional reconfiguration execution i.e., when applying a stored RRCReconfiguration message including reconfigurationWith Sync. | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in sub-clause 5.7.3 of TS 38.331. | a Handover timer |

According to agreements of 3GPP RAN2, at least in a CHO failure case, there may be a time offset between "a time instance of a UE receiving the corresponding CHO command" and "a time instance of the UE starting to perform a CHO procedure." A CHO command may also be named as CHO configuration information. The CHO configuration information may contain: (1) configuration of CHO candidate cell(s) generated by candidate BS(s); and (2) execution condition(s) for the CHO candidate cell(s) generated by a source BS.

More specifically, a UE may receive updated CHO command after UE receives the initial CHO command for a CHO candidate cell, e.g., CHO candidate cell #1. The updated CHO command could include: (1) the change of execution condition(s) of a CHO procedure for CHO candidate cell(s) from a source cell; or (2) the change of RRCReconfiguration According to the legacy 3GPP specification or standard, if there is DAPS handover configuration information but no CHO configuration information after a successful RA procedure whereas a RLF on a target cell occurs during a DAPS handover procedure, a UE performs a normal RRC re-establishment procedure. Embodiments of the present application aim to enhance the recovery procedure after a successful RA procedure whereas a RLF on target cell occurs in the DAPS handover procedure if CHO configuration information is configured to a UE.

More details will be illustrated in the following text in combination with the appended drawings.

FIG. 6 illustrates an exemplary flow chart of a method for transmitting time related assistant information in accordance with some embodiments of the present application. The method 600 may be performed by a UE (e.g., UE 101, the UE, UE 310, or UE 410 as shown and illustrated in any of FIGS. 1-4). Although described with respect to a UE, it should be understood that other devices may also be configured to perform the method as shown and illustrated in FIG. 6.

In the exemplary method 600 as shown in FIG. 6, in operation 601, a UE (e.g., UE 101 as shown and illustrated in FIG. 1) receives CHO configuration information associated with a CHO candidate cell. The CHO configuration information received in operation 601 may include a RRC reconfiguration message. The CHO configuration information may further include a set of one or more execution conditions associated with the CHO candidate cell. The set of one or more execution conditions may be updated and transmitted to the UE before the UE performs a CHO procedure from a source cell to the CHO candidate cell.

For instance, The CHO configuration information received in operation 601 may be initial CHO configuration information configured to the UE. The initial CHO configuration information is CHO configuration information firstly configured to the UE and may also be named as the first CHO configuration information.

In one embodiment, the UE may be in a RRC connected state when performing the operation 601. A RRC connected state may also be named as RRC connection state, RRC CONNECTION state, RRC_CONNECTION state, RRC_CONNECTED state, RRC_Connected state, or the like.

In operation 602, in response to meeting execution condition(s) associated with the CHO candidate cell, the UE performs a CHO procedure from a source cell to the CHO candidate cell.

In operation 603, in response to successfully accessing the CHO candidate cell or in response to an occurrence of a failure during the CHO procedure, the UE transmits time related assistant information to a serving cell of the UE. The serving cell may be the source cell or the CHO candidate cell.

In an embodiment, in response to successfully completing the CHO procedure, the UE transmits, to the CHO candidate cell, an indication of an available state of the time related assistant information. Then, the UE may receive, from the CHO candidate cell, a UE information request message after successfully completing the CHO procedure. The UE may transmit, to the CHO candidate cell, a UE information response message which includes the time related assistant information.

In a further embodiment, the UE may receive latest CHO configuration information, which is associated with the CHO candidate cell, before performing the CHO procedure to the CHO candidate cell. The latest CHO configuration information is the last CHO configuration information configured to the UE before the UE performs the CHO procedure, and may also be named as the last CHO configuration information.

In an Example, the Latest CHO Configuration Information May Include One of:

1) "a latest RRC reconfiguration message before performing the CHO procedure to the CHO candidate cell" and "the set of one or more execution conditions" which is included in the CHO configuration information received in operation 601;
2) "the RRC reconfiguration message" which is included in the CHO configuration information received in operation 601 and "a latest set of one or more execution conditions associated with the CHO candidate cell before performing the CHO procedure to the CHO candidate cell"; and
3) "the latest RRC reconfiguration message before performing the CHO procedure to the CHO candidate cell" and "the latest set of one or more execution conditions associated with the CHO candidate cell before performing the CHO procedure to the CHO candidate cell."

In an Embodiment, the Time Related Assistant Information Includes at Least One of:

(1) a time duration between "a time instance of the UE receiving the CHO configuration information in operation 601" and "a time instance of the UE starting to perform the CHO procedure";
(2) a time duration between "a time instance of the UE receiving the latest RRC reconfiguration message which is included in the latest CHO configuration information" and "a time instance of the UE starting to perform the CHO procedure";
(3) a time duration between "a time instance of the UE receiving the latest set of one or more execution conditions which is included in the latest CHO configuration information" and "a time instance of the UE starting to perform the CHO procedure"; and
(4) a time duration between "a time instance of the UE receiving the latest CHO configuration information" and "a time instance of the UE starting to perform the CHO procedure."

In this Embodiment, the UE May Store at Least One of:

(1) the time instance of the UE receiving the CHO configuration information in operation 601;
(2) the time instance of the UE receiving the latest RRC reconfiguration message included in the latest CHO configuration information;
(3) the time instance of the UE receiving the latest set of one or more execution conditions included in the latest CHO configuration information;
(4) the time instance of the UE receiving the latest CHO configuration information; and
(5) the time instance of the UE starting to perform the CHO procedure.

The following texts describe specific Embodiment 1 of the method as shown and illustrated in FIG. 6.

According to Embodiment 1, a UE, a source BS, and a target BS perform the following operations. The UE may be UE 101, the UE, UE 310, or UE 410 as shown and illustrated in any of FIGS. 1-4. The source BS or the target BS may be BS 102*a*, BS 102*b*, BS 102*c*, a source BS, a target BS, Source BS 320, Target BS 330, BS 420, BS 510, or BS 520 as illustrated and shown in any of FIGS. 1-5.

(1) Step 1: The UE is in a RRC_Connected state. The source BS configures the UE to report a measurement result.
    The UE will report the measurement result based on the configuration information received from the source BS.
(2) Step 2: The UE is configured with CHO configuration information associated with CHO candidate cell(s) based on the measurement result.
    The UE continues to perform a measurement procedure.
    The CHO configuration information contains: (1) configuration information of CHO candidate cell(s) generated by candidate BS(s); and (2) execution condition(s) generated by the source BS. For example, initial CHO configuration information for a CHO candidate cell (e.g., CHO candidate cell #1) is configured to the UE. The initial CHO configuration information is CHO configuration information firstly configured to the UE and may also be named as the first CHO configuration information. The UE may store a time instance of receiving the initial CHO configuration information for CHO candidate cell #1. This time instance of receiving the initial CHO configuration information may be noted as “T1”.

(3) Step 3: The UE may receive updated CHO configuration information for a CHO candidate cell (e.g., CHO candidate cell #1).

Before performing the CHO procedure to CHO candidate cell #1, the UE may receive one or more pieces of updated CHO configuration information for CHO candidate cell #1. The UE may store a time instance of receiving the latest CHO configuration information before performing the CHO procedure from a source cell of the UE to CHO candidate cell #1.

In one example, in the latest CHO configuration information before performing the CHO procedure, the RRC reconfiguration message generated by CHO candidate cell #1 is modified, but execution condition(s) corresponding to CHO candidate cell #1 is not modified. For instance, the UE may store a time instance of receiving this latest CHO configuration information before performing the CHO procedure from a source cell of the UE to CHO candidate cell #1. The time instance of receiving this latest CHO configuration information may be noted as “T2”.

In a further example, in the latest CHO configuration information before performing the CHO procedure, the RRC reconfiguration generated by CHO candidate cell #1 is not modified, but execution condition(s) corresponding to CHO candidate cell #1 is modified. The UE may store a time instance of receiving this latest CHO configuration information before performing the CHO procedure from a source cell of the UE to CHO candidate cell #1. The time instance of receiving this latest CHO configuration information may be noted as “T3”.

In another example, in the latest CHO configuration information before performing the CHO procedure, the RRC reconfiguration generated by CHO candidate cell #1 is modified, and execution condition(s) corresponding to CHO candidate cell #1 is also modified. The UE may store a time instance of receiving this latest CHO configuration information before performing the CHO procedure from a source cell of the UE to CHO candidate cell #1. The time instance of receiving this latest CHO configuration information may be noted as “T4”.

(4) Step 4: The UE performs a CHO procedure towards CHO candidate cell #1 once execution condition(s) for CHO candidate cell #1 is met. The UE starts timer T304.

The UE may store a time instance of starting to perform the CHO procedure. This time instance may be noted as “T5”.

(5) After performing Steps 1-4 of Embodiment 1, there may be following two cases:

Case 1: a successful handover report case. In Case 1, following Steps 5-9 are performed.

Case 2: a RLF report case. In Case 2, following Steps 5'-9' are performed.

Case 1: A Successful Handover Report Case

Step 5: The UE successfully accesses CHO candidate cell #1 and stops timer T304.

It means that, after the UE accesses CHO candidate cell #1, the CHO procedure is successful.

Step 6: The UE transmits RRCReconfigurationComplete message to the target BS. The RRCReconfiguration-Complete message includes an indication of an available state of assistant information. The assistant information is associated with the successful CHO procedure.

Step 7: After receiving the indication from the UE, the target BS transmits UE Information Request message to the UE.

Step 8: The UE transmits UE information response message to the target BS.

The UE information response message may include a time duration between “a time instance of starting to perform the CHO procedure” and “a time instance of receiving CHO configuration information (i.e., the corresponding CHO command) at the UE” at least in the CHO failure case. The time duration may be “Time-A”, “Time-B”, “Time-C”, or “Time-D” as listed below.

1) Time-A: a time duration between “a time instance of receiving the initial RRCReconfiguration message generated by the target cell (e.g., CHO candidate cell #1) received at the UE” and “a time instance of starting to perform an initial CHO procedure towards CHO candidate cell #1.”

For instance, both the CHO execution procedure and the initial RRCReconfiguration message are associated with the same CHO configuration identifier (e.g., CondConfigId as specified in 3GPP standard documents) or the same physical cell identifier (PCI).

2) Time-B: a time duration between “a time instance of receiving the corresponding updated RRCReconfiguration message generated by the target cell (e.g., CHO candidate cell #1)” and “a time instance of starting to perform an initial CHO procedure towards CHO candidate cell #1” regardless of whether the execution condition(s) generated by the source cell of the UE is modified or not.

For example, Time-B may be computed as a time offset between “T5” and “T2”.

The UE stores the time information when the UE receives the CHO configuration information, which includes configuration of CHO candidate cell(s) generated by candidate BS(s) and execution condition(s) generated by a source BS. The UE needs to update the time information when the UE receives the modification or update of RRCReconfiguration message generated by the target cell. The UE does not update the time information when the UE receives the modification of execution condition(s).

3) Time-C: a time duration between “a time instance of receiving the corresponding updated execution condition(s)” and “a time instance of starting to perform an initial CHO procedure towards CHO candidate cell #1” regardless of whether the configuration of CHO candidate cell generated by the candidate BS(s) is updated or not.

For example, Time-C may be computed as a time offset between “T5” and “T3”.

4) Time-D: a time duration between “a time instance of receiving the corresponding updated CHO configuration” and “a time instance of starting to perform an initial CHO procedure towards CHO candidate cell #1”

The corresponding updated CHO configuration contains the configuration of CHO candidate cell(s) generated by the candidate BS(s) and execution condition(s) generated by the source BS.

For example, Time-D may be computed as a time offset between "T5" and "T2".

Step 9: After the target BS receives the report message from the UE, the target BS will transmit one Xn message (e.g., a failure indication message or a new Xn message) to the source BS.

The report message reported by the UE is transmitted as a container.

Xn message includes the indication of "Successful conditional HO report".

Case 2: A Radio Link Failure (RLF) Report Case

Step 5': The UE fails to access the target cell (cell #1) and timer T304 expires.

It means a CHO failure happens.

Step 6': The UE transmits RRCReestalishmentRequest message to the serving cell. After successfully re-establishing to one suitable cell, the UE transmits an indication of an available state of the assistant information to the serving cell. The assistant information is associated with a failure report.

Step 7': The target BS transmits UE Information Request message to the UE after receiving the indication from the UE.

Step 8': The UE transmits UE information response message to the target BS.

The UE information response message may include a time duration between "a time instance of starting to perform the CHO procedure" and "a time instance of receiving CHO configuration information (i.e., the corresponding CHO command) at the UE" at least in the CHO failure case. The time duration may be "Time-A", "Time-B", "Time-C", or "Time-D" as listed in above Step 8 of Embodiment 1 performed in case 1.

Step 9': After the target BS receives the report message from the UE, the target BS will transmit one Xn message (e.g., a failure indication message or a new Xn message) to the source BS.

The report message reported by the UE is transmitted as a container.

Xn message includes the indication of "a handover (HO) failure" or "a conditional handover (CHO) failure".

Details described in all other embodiments of the present application (for example, details of how to understand the corresponding CHO command in the agreements of 3GPP RAN2) are applicable for the embodiments of FIG. 6. Moreover, details described in the embodiments of FIG. 6 are applicable for all the embodiments of FIGS. 1-5, 7, and 8.

Under some scenarios, after performing a DAPS handover procedure, there may be two cases, one case is that the UE successfully completes the DAPS handover procedure, and the other case is that the UE unsuccessfully completes the DAPS handover procedure. In these two cases, the UE needs to report some related information. Specific examples are described in the embodiments of FIG. 7.

Figure 7:
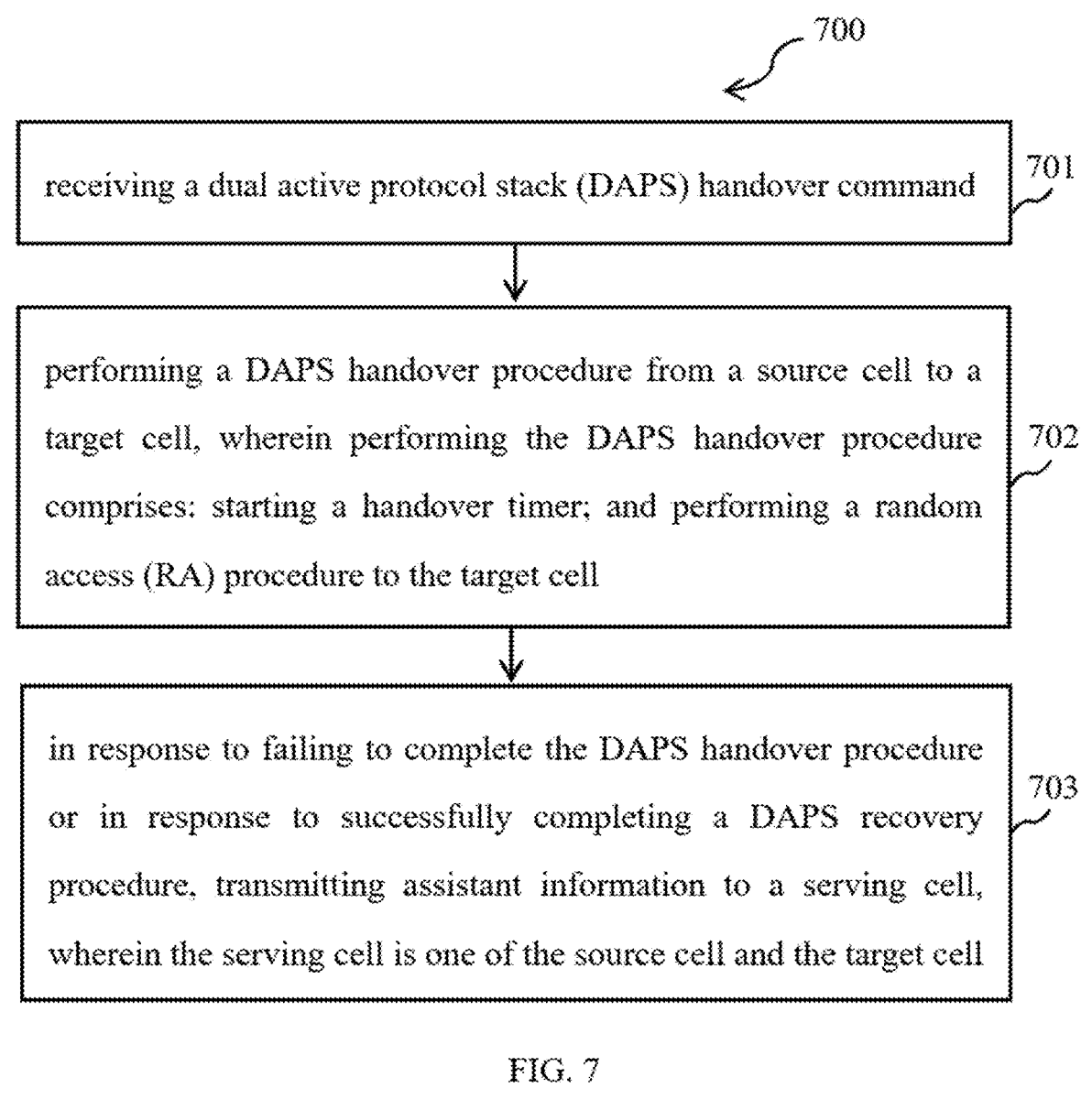

FIG. 7 illustrates an exemplary flow chart of a method for performing a DAPS handover procedure in accordance with some embodiments of the present application. The method 700 may be performed by a UE (e.g., UE 101, the UE, UE 310 or UE 410 as shown and illustrated in any of FIGS. 1-4). Although described with respect to a UE, it should be understood that other devices may be configured to perform a method similar to that of FIG. 7.

In the exemplary method 700 as shown in FIG. 7, in operation 701, a UE (e.g., UE 101 as shown and illustrated in FIG. 1) receives a DAPS handover command. For instance, the UE is in a RRC connected state.

In operation 702, the UE performs a DAPS handover procedure from a source cell to a target cell. Performing the DAPS handover procedure may comprise: starting a handover timer; and performing a RA procedure to the target cell. For example, the handover timer is timer T304 as specified in 3GPP standard documents.

In operation 703, in response to failing to complete the DAPS handover procedure or in response to successfully completing a DAPS recovery procedure, the UE transmits assistant information to a serving cell. The serving cell may be the source cell or a target cell in different embodiments.

In an embodiment, the UE receives CHO configuration information, which is associated with CHO candidate cell(s). In this embodiment, if a RLF on the source cell occurs and the handover timer is running, the UE may store a measurement result of the CHO candidate cell(s), and the assistant information transmitted in operation 703 includes the measurement result of the CHO candidate cell(s). In this embodiment, if the UE accesses the target cell, the UE may stop the handover timer (e.g., timer T304) and store a measurement result of the CHO candidate cell(s) that is included in the assistant information transmitted in operation 703. In this embodiment, if the UE accesses the target cell, the UE may stop the handover timer (e.g., timer T304); and if a RLF occurs on the target cell after stopping the handover timer, the UE may store a measurement result of the CHO candidate cell(s) that is included in the assistant information transmitted in operation 703.

For Instance, the Measurement Result of the CHO Candidate Cell(s) Includes at Least One of:

(1) a measurement result of a source cell of the UE when successfully completing the RA procedure to a target cell of the UE;

(2) a measurement result of the target cell when successfully completing the RA procedure to the target cell;

(3) a measurement result of one or more neighbour cells of the UE when successfully completing the RA procedure to the target cell; and (4) a measurement result of the CHO candidate cell(s) when successfully completing the RA procedure to the target cell.

In a further embodiment, if the UE accessing the target cell, the UE determines a time duration between "a time instance of accessing the target cell" and "a time instance of receiving a RRC reconfiguration message including an indication of releasing a source link of the source cell." The assistant information transmitted in operation 703 may include the determined time duration in this further embodiment.

In another embodiment, during performing the recovery procedure, the UE may fall back to connect to the source cell via a source link of the source cell if:

the UE accesses the target cell;

a RLF on the target cell occurs before the UE receives an indication of releasing the source link; and a channel quality of the source link is greater than a threshold. The threshold may be configured by the source cell or the target cell.

In yet another embodiment, if a RLF on the target cell occurs before the UE receives an indication of releasing a source link of the source cell or if a failure on the target cell occurs during the RA procedure, the UE may perform a recovery procedure by selecting to:

fall back to connect to the source cell via a source link of the source cell; or perform a cell selection procedure, to select a selected cell, and perform a CHO procedure.

In this yet another embodiment, if the source cell is a suitable cell, the UE may fall back to connect to the source cell via the source link; if the source cell is not the suitable cell whereas at least one CHO candidate cell is the suitable cell, the UE may perform the CHO procedure; and if the source cell is not the suitable cell and no CHO candidate cell is the suitable cell, the UE may transmit a RRC reestablishment request message to the selected cell.

The following texts describe specific Embodiments 2-5 of the method as shown and illustrated in FIG. 7.

Embodiment 2: Regarding a Successful DAPS Handover Report

According to Embodiment 2, a UE, a source BS, and a target BS perform the following operations. The UE may be UE 101, the UE, UE 310, or UE 410 as shown and illustrated in any of FIGS. 1-4. The source BS or the target BS may be BS 102*a*, BS 102*b*, BS 102*c*, a source BS, a target BS, Source BS 320, Target BS 330, BS 420, BS 510, or BS 520 as illustrated and shown in any of FIGS. 1-5.

(1) Step 1: The UE is in a RRC_Connected state. The source BS configures the UE to report a measurement result.

The UE will report the measurement result based on the configuration information received from the source BS.

(2) Step 2: The UE is configured with CHO configuration information associated with CHO candidate cell(s) based on the measurement result reported by the UE. This Step 2 is optional. "Optional" means that Step 2 may be performed in some scenarios, but may not be performed in some other scenarios.

The UE continues to perform a measurement procedure.

(3) Step 3: The UE reports the measurement result based on the configuration information received from the source BS.

The source BS can determine whether the UE should perform a HO procedure or not based on the measurement result from the UE. The source BS may decide to perform a normal HO procedure if a CHO procedure is not triggered.

(4) Step 4: The UE receives a HO command with DAPS configuration information from the source BS.

The configuration information from a target cell is included in the HO command with DAPS configuration information.

(5) Step 5: After the UE receives the HO command with DAPS configuration information, the UE starts timer T304 and performs a RA procedure.

A RLF on a source cell may happen. The UE may store the following measurement result(s) upon an occurrence of a RLF on the source cell:

The measurement result(s) of the source cell, the target cell and neighbour cells of the UE when a RLF on the source cell happens during a DAPS handover procedure.

The measurement result(s) of CHO candidate cell(s) when a RLF on the source cell happens during the DAPS handover procedure.

(6) Step 6: The UE accesses the target cell and stops timer T304.

The UE may store following measurement result(s) upon stopping timer T304:

The measurement result(s) of the source cell, the target cell and neighbour cells upon a successful RA procedure for the DAPS handover procedure.

The measurement result(s) of CHO candidate cell(s) upon a successful RA procedure for the DAPS handover procedure.

It means a successful DAPS handover procedure after the UE accesses the target cell.

(7) Step 7: The UE transmit RRCReconfigurationComplete message to a target BS, and the RRCReconfigurationComplete message includes the indication of an available state of assistant information. The assistant information is associated with a successful DAPS handover procedure.

(8) Step 8: The target BS transmits UE Information Request message to the UE after receiving the indication from the UE.

(9) Step 9: The UE transmits UE information response message to the target BS.

The UE information response message may include at least one of:

The measurement result(s) of CHO candidate cells when RLF on source cell happens during DAPS handover procedure while timer T304 for DAPS handover is running.

The measurement result(s) of the source cell, the target cell and neighbour cells upon a successful RA procedure for the DAPS handover procedure when timer T304 has been stopped.

The measurement result(s) of CHO candidate cells upon a successful RA procedure for the DAPS handover procedure when Timer T304 has been stopped.

Time elapsed since the successful RA procedure until the UE receiving RRCReconfiguration message which includes an indication of releasing a source connection, when no failure on the source cell happens and the RA procedure is successful.

This information can be used to record a time duration of maintaining both source and target links of the UE.

(10) Step 10: After the target BS receives the report message from the UE, the target BS will transmit one Xn message (e.g., a failure indication message or a new Xn message) to the source BS.

The report message reported by UE is transmitted as a container.

A Xn message includes an indication of "a successful DAPS report".

Embodiment 3: Regarding a DAPS Handover Failure Report

According to Embodiment 3, a UE, a source BS, and a target BS perform the following operations. The UE may be UE 101, the UE, UE 310, or UE 410 as shown and illustrated in any of FIGS. 1-4. The source BS or the target BS may be BS 102*a*, BS 102*b*, BS 102*c*, a source BS, a target BS, Source BS 320, Target BS 330, BS 420, BS 510, or BS 520 as illustrated and shown in any of FIGS. 1-5.

(1) Steps 1-5 of Embodiment 3 are the same as Steps 1-5 of Embodiment 2.

(2) Step 6: after performing Steps 1-5, there may be following two cases, i.e., Case A and Case B.

Case A: The UE accesses the target cell and stops timer T304. Then, a RLF on the target cell happens.

The UE may store at least one of following measurement result(s) upon stopping timer T304:

The measurement result(s) of the source cell, the target cell and neighbour cells upon a successful RA procedure for the DAPS handover procedure.

The measurement result(s) of CHO candidate cell (s) upon a successful RA procedure for the DAPS handover procedure.

The measurement result(s) of the source cell, the target cell and neighbour cells when a RLF on the target cell happens after a successful RA procedure.

The measurement result(s) of CHO candidate cells when a RLF on target cell happens after a successful RA procedure.

It means a successful DAPS handover procedure after the UE accesses the target cell.

Case B: The UE fails to access the target cell (i.e., time T304 expires)

(3) Step 7: The UE performs a RRC re-establishment procedure. Then, the UE transmit RRCReconfigurationComplete message to the target BS after the successful RRC re-establishment procedure. The RRCReconfigurationComplete message includes an indication of an available state of assistant information. The assistant information is associated with the successful DAPS handover procedure.

(4) Step 8: The target BS transmits UE Information Request message to the UE after receiving the indication from the UE.

(5) Step 9: The UE transmits UE information response message to the target BS.

The UE information response message may include at least one of:

The measurement result(s) of CHO candidate cells when RLF on source cell happens during DAPS handover procedure while timer T304 for DAPS handover is running.

The measurement result(s) of the source cell, the target cell and neighbour cells upon a successful RA procedure for the DAPS handover procedure when timer T304 has been stopped.

The measurement result(s) of CHO candidate cell(s) upon a successful RA procedure for the DAPS handover procedure when Timer T304 has been stopped.

The measurement result(s) of the source cell, the target cell and neighbour cells when a RLF on the target cell happens after a successful RA procedure.

The measurement result(s) of CHO candidate cells when a RLF on the target cell happens after a successful RA procedure.

Time elapsed since the successful RA procedure until the UE receives RRCReconfiguration message which includes an indication of releasing a source connection, when no failure happens on the source cell and the RA procedure is successful.

This information can be used to record a time duration of maintaining both source and target links of the UE.

(6) Step 10: After the target BS receives the report message from the UE, the target BS will transmit one Xn message (e.g., a failure indication message or a new Xn message) to source BS.

The report message reported by UE is transmitted as a container.

A Xn message includes an indication of "a successful DAPS report".

Embodiment 4: Regarding a Failed DAPS Handover Procedure

In Embodiment 4, a UE, a source BS, and a target BS perform the following operations. The UE may be UE 101, the UE, UE 310, or UE 410 as shown and illustrated in any of FIGS. 1-4. The source BS or the target BS may be BS 102*a*, BS 102*b*, BS 102*c*, a source BS, a target BS, Source BS 320, Target BS 330, BS 420, BS 510, or BS 520 as illustrated and shown in any of FIGS. 1-5.

(1) Steps 1-4 of Embodiment 4 are the same as Steps 1-4 of Embodiment 2.

(2) Step 5: The UE performs a DAPS handover procedure and timer T304 expires.

After a RA failure on target cell happens during the DAPS handover procedure, the UE performs a recovery procedure. For example:

If the source cell is the suitable cell, the UE falls back to the source connection. If the source cell is not the suitable cell but at least one CHO candidate cell is the suitable cell, the UE performs a CHO procedure. If the source cell is not the suitable cell and no CHO candidate cell is the suitable cell, the UE transmits the RRCReestablishrnentRequest message to the selected cell.

Embodiment 5: Regarding a Failed DAPS Handover Procedure

In Embodiment 5, a UE, a source BS, and a target BS perform the following operations. The UE may be UE 101, the UE, UE 310, or UE 410 as shown and illustrated in any of FIGS. 1-4. The source BS or the target BS may be BS 102*a*, BS 102*b*, BS 102*c*, a source BS, a target BS, Source BS 320, Target BS 330, BS 420, BS 510, or BS 520 as illustrated and shown in any of FIGS. 1-5.

(1) Steps 1-4 of Embodiment 5 are the same as Steps 1-4 of Embodiment 2.

(2) Step 5: After the UE receives a HO command with DAPS configuration information, the UE performs a DAPS handover procedure. Then, the UE accesses the target cell and stops timer T304.

It means a successful DAPS handover procedure after the UE accesses the target cell.

(3) Step 6: A RLF on the target cell happens before receiving the indication of releasing the source connection.

After a successful RA procedure and an occurrence of a RLF on target cell in the DAPS handover procedure, the UE performs a recovery procedure. In some embodiments, there may be following two exemplary recovery procedures, i.e., Option 1 and Option 2:

Option 1: The UE may continue to monitor the source link after a successful RA procedure during the DAPS handover procedure. However, a RLF on the target cell happens after the successful RA procedure before receiving the indication of releasing the source link. In this case, the UE may fall back to a source connection if the channel quality of the source link is greater than a threshold.

The threshold could be configured by the source cell or the target cell. If the threshold is configured by the source cell, the UE needs to store the threshold after a successful RA procedure.

Option 2: A RLF on the target cell happens after the successful RA procedure before receiving an indication of releasing the source link. The UE initiates a RRC re-establishment procedure and performs a cell selection procedure. If the source cell is the suitable cell, the UE may fall back to the source connection. If the source cell is not the suitable cell and at least one CHO candidate cell is the suitable cell, the UE may perform a CHO procedure. If the source cell is not the suitable cell and no CHO candidate cell is the suitable cell, the UE may transmit the RRCReestablishrnentRequest message to the selected cell.

Details described in all other embodiments of the present application (for example, details of additional measurement information reported in a successful DAPS report or a DAPS failure report, additional measurement information reported in the successful DAPS report or the DAPS failure report; a recovery procedure after a successful RA procedure and an occurrence of a RLF on a target cell during the DAPS handover procedure; and a recovery procedure after an occurrence of a RA failure on a target cell during the DAPS handover procedure) are applicable for the embodiments of FIG. 7. Moreover, details described in the embodiments of FIG. 7 are applicable for all the embodiments of FIGS. 1-6 and 8.

Figure 8:
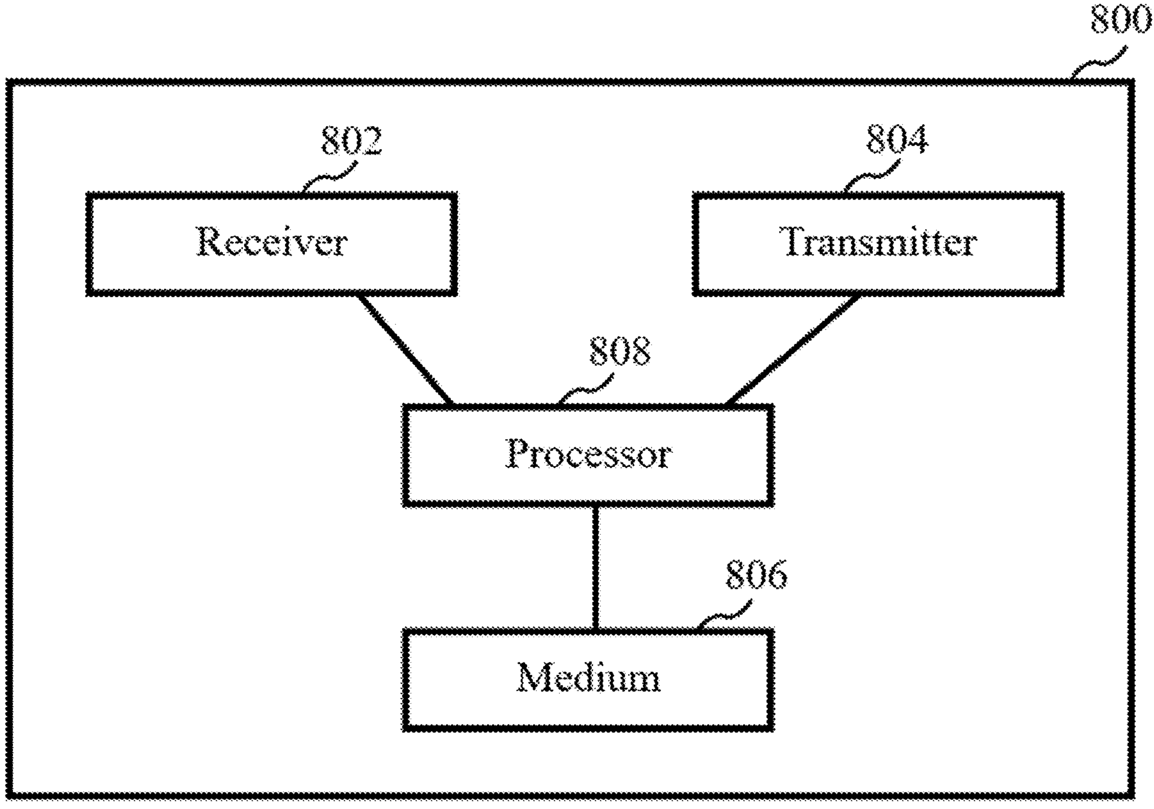
FIG. 8 illustrates an exemplary block diagram of an apparatus according to some embodiments of the present application.

FIG. 8 illustrates an exemplary block diagram of an apparatus according to some embodiments of the present application. In some embodiments of the present application, the apparatus 800 may be a UE, which can at least perform the method illustrated in FIG. 6 or FIG. 7.

As shown in FIG. 8, the apparatus 800 may include at least one receiver 802, at least one transmitter 804, at least one non-transitory computer-readable medium 806, and at least one processor 808 coupled to the at least one receiver 802, the at least one transmitter 804, and the at least one non-transitory computer-readable medium 806.

Although in FIG. 8, elements such as the at least one receiver 802, the at least one transmitter 804, the at least one non-transitory computer-readable medium 806, and the at least one processor 808 are described in the singular, the plural is contemplated unless limitation to the singular is explicitly stated. In some embodiments of the present application, the at least one receiver 802 and the at least one transmitter 804 are combined into a single device, such as a transceiver. In certain embodiments of the present application, the apparatus 800 may further include an input device, a memory, and/or other components.

In some embodiments of the present application, the at least one non-transitory computer-readable medium 806 may have stored thereon computer-executable instructions which are programmed to implement the operations of the methods, for example as described in view of any of FIGS. 6 and 7, with the at least one receiver 802, the at least one transmitter 804, and the at least one processor 808.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a user equipment (UE), the method comprising:

receiving first conditional handover (CHO) configuration information that is associated with a CHO candidate cell, the first CHO configuration information including a first radio resource control (RRC) reconfiguration message and a first set of one or more execution conditions;

in response to meeting one or more execution conditions associated with the CHO candidate cell, performing a CHO procedure from a source cell to the CHO candidate cell; and in response to successfully accessing the CHO candidate cell or in response to an occurrence of a failure during the CHO procedure, transmitting time related assistant information to a serving cell that is one of the source cell or the CHO candidate cell, wherein the time related assistant information includes a time duration between a time instance of receiving a latest CHO configuration information and a time instance of starting to perform the CHO procedure.

2. The method of claim 1, further comprising:

in response to successfully completing the CHO procedure, transmitting, to the CHO candidate cell, an indication of an available state of the time related assistant information;

receiving, from the CHO candidate cell, a UE information request message after successfully completing the CHO procedure; and transmitting a UE information response message to the CHO candidate cell, wherein the UE information response message includes the time related assistant information.

3. The method of claim 1, further comprising:

receiving the latest CHO configuration information before performing the CHO procedure, wherein the latest CHO configuration information is associated with the CHO candidate cell and includes one of:

a latest RRC reconfiguration message and the first set of one or more execution conditions;

the first RRC reconfiguration message and a latest set of one or more execution conditions associated with the CHO candidate cell; or the latest RRC reconfiguration message and the latest set of one or more execution conditions.

4. The method of claim 1, further comprising:

storing at least one of:

a time instance of receiving the first CHO configuration information;

a time instance of receiving a latest RRC reconfiguration message;

a time instance of receiving a latest set of one or more execution conditions;

the time instance of receiving the latest CHO configuration information; or the time instance of starting to perform the CHO procedure.

5. A user equipment (UE) for wireless communication, comprising:

at least one memory; and at least one processor coupled with the at least one memory and configured to cause the UE to:

receive first conditional handover (CHO) configuration information that is associated with a CHO candidate cell, the first CHO configuration information including a first radio resource control (RRC) reconfiguration message and a first set of one or more execution conditions;

in response to meeting one or more execution conditions associated with the CHO candidate cell, perform a CHO procedure from a source cell to the CHO candidate cell; and in response to successfully accessing the CHO candidate cell or in response to an occurrence of a failure during the CHO procedure, transmit time related assistant information to a serving cell that is one of the source cell or the CHO candidate cell, wherein the time related assistant information includes a time duration between a time instance of receiving a latest CHO configuration information and a time instance of starting to perform the CHO procedure.

6. The UE of claim 5, wherein the at least one processor is configured to cause the UE to:

in response to successfully completing the CHO procedure, transmit, to the CHO candidate cell, an indication of an available state of the time related assistant information;

receive, from the CHO candidate cell, a UE information request message after successfully completing the CHO procedure; and transmit a UE information response message to the CHO candidate cell, wherein the UE information response message includes the time related assistant information.

7. The UE of claim 5, wherein the at least one processor is configured to cause the UE to receive the latest CHO configuration information before performing the CHO procedure, wherein the latest CHO configuration information is associated with the CHO candidate cell and includes one of:

a latest RRC reconfiguration message and the first set of one or more execution conditions;

the first RRC reconfiguration message and a latest set of one or more execution conditions associated with the CHO candidate cell; or the latest RRC reconfiguration message and the latest set of one or more execution conditions.

8. The UE of claim 5, wherein the at least one processor is configured to cause the UE to store at least one of:

a time instance of receiving the first CHO configuration information;

a time instance of receiving a latest RRC reconfiguration message;

a time instance of receiving a latest set of one or more execution conditions;

the time instance of receiving the latest CHO configuration information; or the time instance of starting to perform the CHO procedure.

9. The UE of claim 5, wherein the at least one processor is configured to cause the UE to:

receive a dual active protocol stack (DAPS) handover command;

perform a DAPS handover procedure from the source cell to a target cell, the DAPS handover procedure including to:

start a handover timer;

perform a random access (RA) procedure to the target cell; and in response to failing to complete the DAPS handover procedure or in response to successfully completing a DAPS recovery procedure, transmit assistant information to the serving cell that is one of the source cell or the target cell.

10. A user equipment (UE) for wireless communication, comprising:

at least one memory; and at least one processor coupled with the at least one memory and configured to cause the UE to:

receive first conditional handover (CHO) configuration information that is associated with a CHO candidate cell, the first CHO configuration information including a first radio resource control (RRC) reconfiguration message and a first set of one or more execution conditions;

in response to meeting one or more execution conditions associated with the CHO candidate cell, perform a CHO procedure from a source cell to the CHO candidate cell;

in response to successfully accessing the CHO candidate cell or in response to an occurrence of a failure during the CHO procedure, transmit time related assistant information to a serving cell that is one of the source cell or the CHO candidate cell, wherein the time related assistant information includes a time duration between a time instance of receiving a latest CHO configuration information and a time instance of starting to perform the CHO procedure;

in response to successfully completing the CHO procedure, transmit, to the CHO candidate cell, an indication of an available state of the time related assistant information;

receive, from the CHO candidate cell, a UE information request message after successfully completing the CHO procedure; and transmit a UE information response message to the CHO candidate cell, wherein the UE information response message includes the time related assistant information.

11. The UE of claim 10, wherein the at least one processor is further configured to cause the UE to:

receive the latest CHO configuration information before performing the CHO procedure, wherein the latest CHO configuration information is associated with the CHO candidate cell and includes one of:

a latest RRC reconfiguration message and the first set of one or more execution conditions;

the first RRC reconfiguration message and a latest set of one or more execution conditions associated with the CHO candidate cell; or the latest RRC reconfiguration message and the latest set of one or more execution conditions.

12. The UE of claim 10, wherein the at least one processor is further configured to cause the UE to:

store at least one of:

the time instance of receiving the first CHO configuration information;

the time instance of receiving a latest RRC reconfiguration message;

the time instance of receiving a latest set of one or more execution conditions;

the time instance of receiving the latest CHO configuration information; or the time instance of starting to perform the CHO procedure.

* * * * *